United States Patent
Roncuzzi et al.

(10) Patent No.: US 9,580,354 B2
(45) Date of Patent: Feb. 28, 2017

(54) PHENOLIC RESIN, PREPARATION PROCESS, SIZING COMPOSITION FOR MINERAL FIBERS AND RESULTING PRODUCT

(75) Inventors: Claudio Roncuzzi, Paris (FR); Jérôme Douce, Lyons (FR); Guillaume Rousselet, Étouy (FR); Jean-Louis Mallier, Laigneville (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 805 days.

(21) Appl. No.: 13/819,127

(22) PCT Filed: Aug. 26, 2011

(86) PCT No.: PCT/FR2011/051969
§ 371 (c)(1),
(2), (4) Date: Mar. 25, 2013

(87) PCT Pub. No.: WO2012/025699
PCT Pub. Date: Mar. 1, 2012

(65) Prior Publication Data
US 2013/0183524 A1    Jul. 18, 2013

(30) Foreign Application Priority Data
Aug. 27, 2010  (FR) ...................... 10 56803

(51) Int. Cl.
| | |
|---|---|
| C08G 14/06 | (2006.01) |
| C08G 14/04 | (2006.01) |
| C03C 25/34 | (2006.01) |
| C09J 161/00 | (2006.01) |
| C09J 161/06 | (2006.01) |
| C09J 161/14 | (2006.01) |
| C08G 8/04 | (2006.01) |
| C08K 5/053 | (2006.01) |
| C08K 5/151 | (2006.01) |
| C08K 5/17 | (2006.01) |

(52) U.S. Cl.
CPC .............. *C03C 25/34* (2013.01); *C08G 14/06* (2013.01); *C09J 161/00* (2013.01); *C09J 161/06* (2013.01); *C09J 161/14* (2013.01); *C08K 5/053* (2013.01); *C08K 5/151* (2013.01); *C08K 5/17* (2013.01); *Y10T 428/2933* (2015.01)

(58) Field of Classification Search
CPC ...................................... C08G 14/06
USPC ............................ 528/161; 524/608; 428/375
See application file for complete search history.

(56) References Cited

U.S. PATENT DOCUMENTS

| | | |
|---|---|---|
| 5,270,434 A | 12/1993 | Tetart et al. |
| 5,705,537 A | 1/1998 | Hartman, Jr. et al. |
| 6,362,275 B1 * | 3/2002 | Mani et al. ................... 524/841 |

FOREIGN PATENT DOCUMENTS

| | | |
|---|---|---|
| CN | 101558096 A | 10/2009 |
| EP | 0 148 050 | 7/1985 |
| EP | 0 480 778 | 4/1992 |
| FR | 2 842 815 A1 | 1/2004 |
| WO | WO 2008/005729 | 1/2008 |
| WO | WO 2008/043960 | 4/2008 |
| WO | WO 2008/043961 A1 | 4/2008 |
| WO | WO 2009/136105 A2 | 11/2009 |

OTHER PUBLICATIONS

International Search Report as issued for International Application No. PCT/FR2011/051969, dated Nov. 25, 2011.

* cited by examiner

*Primary Examiner* — Duc Truong
(74) *Attorney, Agent, or Firm* — Pillsbury Winthrop Shaw Pittman LLP

(57) ABSTRACT

A liquid phenolic resin intended to participate in the makeup of a sizing composition for mineral fibers is essentially composed of phenol-formaldehyde and phenol-formaldehyde-glycine condensates. A process for the manufacture of the resin, the sizing composition including the resin and the insulating products based on mineral fibers sized by means of the abovementioned sizing composition are presented.

20 Claims, No Drawings

PHENOLIC RESIN, PREPARATION PROCESS, SIZING COMPOSITION FOR MINERAL FIBERS AND RESULTING PRODUCT

CROSS-REFERENCE TO RELATED APPLICATIONS

This application is the U.S. National Stage of PCT/FR2011/051969, filed Aug. 26, 2011, which in turn claims priority to French Application No. 1056803 filed Aug. 27, 2010. The content of these applications are incorporated herein by reference in their entirety.

The invention relates to a phenolic resin intended to participate in the makeup of a sizing composition for mineral fibers. This resin is obtained by condensation of phenol, formaldehyde and glycine in the presence of a basic catalyst and it is characterized by a low level of free formaldehyde and an excellent stability.

The invention also relates to a process for the preparation of this resin, to the composition for sizing mineral fibers comprising said resin and to the insulating products which result therefrom.

Insulating products based on mineral fibers can be formed starting from fibers obtained by different processes, for example according to the known technique of internal or external centrifugal fiberizing. The technique by internal centrifugation consists in introducing the molten material (generally glass or rock) into a centrifugal device comprising a multitude of small orifices, the material being projected toward the peripheral wall of the device under the action of the centrifugal force and escaping therefrom in the form of filaments. On leaving the centrifugal device, the filaments are drawn and carried toward a receiving member by a gas stream having a high temperature and a high speed, in order to form a web of fibers.

In order to provide for the assembly of the fibers together and to make it possible for the web to have cohesion, a sizing composition which comprises a thermosetting resin is projected onto the fibers on leaving the centrifugal device. The web of fibers coated with the sizing composition is subjected to a heat treatment (at a temperature generally of greater than 100° C.) in order to bring about the polycondensation of the resin and to obtain a thermal and/or acoustic insulating product having specific properties, in particular dimensional stability, tensile strength, thickness recovery after compression and homogeneous color.

The sizing composition is composed of the resin (which is generally provided in the form of an aqueous solution) and of optional additives, such as urea, silanes, mineral oils, aqueous ammonia and ammonium sulfate, and water. The role of the water is to adjust the properties of the sizing composition in order to allow it to be easily applied to the fibers—generally by spraying—and to cool the fibers. Optionally, additional water can be sprayed over the fibers via a separate device.

The properties of the sizing composition largely depend on the characteristics of the resin. From the viewpoint of the application, it is necessary for the sizing composition to exhibit good sprayability and for it to be able to be deposited at the surface of the fibers in order to bind them at the junctions. The sprayability of the sizing composition is directly related to the ability which the resin has to be able to be diluted in a large amount of water and to remain stable over time.

The ability to be diluted is characterized by the "dilutability", which is defined as being the volume of deionized water which it is possible, at a given temperature, to add to a unit of volume of the aqueous resin solution before the appearance of a permanent cloudiness. It is generally considered that a resin is capable of being used as a size when its dilutability is equal to or greater than 1000%, at 20° C. A dilutability equal to or greater than 2000% at 20° C. is qualified as "infinite dilutability".

The resin also has to be stable for a given period of time before being used to form the sizing composition, which composition is generally prepared at the time of use by mixing the resin and the abovementioned additives and optionally by adding further water. In particular, the resin has to be stable for at least 8 days at a temperature of the order of 12 to 18° C.

The resin capable of being used in a sprayable sizing composition has to exhibit a dilutability in water of greater than or equal to 1000%, at 20° C. for at least 8 days, preferably of greater than or equal to 2000%.

At the regulatory level, it is necessary for the resin to be regarded as nonpolluting, that is to say for it to comprise—and for it to generate during the sizing stage or subsequently—as little as possible in the way of compounds regarded as being able to harm human health or the environment.

The most commonly used thermosetting resins are phenolic resins belonging to the family of the resoles. In addition to their good crosslinkability under the abovementioned thermal conditions, these resins are very soluble in water, have good affinity for mineral fibers, in particular glass fibers, and are relatively inexpensive.

These resins are obtained by condensation of phenol and formaldehyde, in the presence of a basic catalyst, in a formaldehyde/phenol molar ratio generally of greater than 1, so as to promote the reaction between the phenol and the formaldehyde and to reduce the level of residual phenol in the resin. The residual content of formaldehyde and of phenol in the resin remains high.

In order to reduce the amount of residual formaldehyde, it is known to add, to the resin, a sufficient amount of urea which reacts with the free formaldehyde with the formation of urea-formaldehyde condensates (see EP 0 148 050 A1). The resin obtained includes phenol-formaldehyde and urea-formaldehyde condensates, exhibits a level of free formaldehyde and of free phenol, expressed as total weight of liquid, of less than or equal to 3% and 0.5% respectively, and has a dilutability in water at least equal to 1000%.

If the amount of residual phenol is acceptable, on the other hand the amount of residual formaldehyde is too high to meet current regulatory constraints.

Furthermore, it has been found that the resin is not stable under the conditions which are applied during the heat treatment of the sized fibers for the purpose of obtaining the crosslinking of the resin in order to form the final insulating products. Thus, in the oven where this treatment is carried out, the urea-formaldehyde condensates decompose and release formaldehyde, which increases the emissions of undesirable gases into the atmosphere. Formaldehyde can also be released from the final product, during the use thereof as thermal and/or acoustic insulator.

Provision has been made, in EP 0 480 778 A1, to replace a portion of the urea by an amine which reacts with the free phenol and the free formaldehyde according to the Mannich reaction in order to form a condensation product having an improved thermal stability. The level of free phenol and of free formaldehyde of this resin is less than or equal to 0.20% and less than or equal to 3% respectively.

A description is given, in WO 2008/043960 A1, of a phenolic resin with a low content of free formaldehyde, of less than 0.1%, which is essentially composed of phenol-formaldehyde and phenol-formaldehyde-amine condensates. The resin of the example is acidic (pH=5) and it is stable for 8 days at 14° C. and 21 days at 8° C. (dilutability in water, at 20° C., of greater than 1000%).

Such a pH is obtained by the use of sulfamic acid, which is an expensive starting material. In addition, such a low pH can bring about problems of corrosion of industrial plants, unless the latter are entirely provided with equipment made of stainless steel.

The aim of the present invention is to provide a phenolic resin which does not involve treatment with sulfamic acid, which retains a low proportion of free formaldehyde and of free phenol and which has excellent stability.

The phenolic resin in accordance with the invention is capable of being used in a sprayable sizing composition and generates little in the way of undesirable emissions.

Another subject matter of the invention is a process for the manufacture of the resin which does not use urea to reduce the content of free formaldehyde and which does not comprise any stage of treatment with an acid, in particular sulfamic acid.

Another subject matter of the invention is a sizing composition comprising said resin, the use thereof to size mineral fibers for the purpose of forming thermal and/or acoustic insulating products and the products thus obtained.

The liquid resin in accordance with the invention, intended to be used in a sizing composition for mineral fibers, essentially comprises phenol-formaldehyde (P-F) and phenol-formaldehyde-glycine (P-F-G) condensates. The liquid resin exhibits a level of free formaldehyde at most equal to 0.5%, preferably at most 0.3% and advantageously at most 0.1%, as total weight of liquid.

The level of free phenol of the resin is less than or equal to 0.5%, preferably less than or equal to 0.3% and advantageously less than or equal to 0.1%, as total weight of liquid.

The resin exhibits a pH value, measured at 20° C., which varies from 4 to 11, preferably from 6.5 to 9.0 and advantageously from 7.5 to 8.3.

The resin exhibits a dilutability in water, measured at 20° C., at least equal to 1000% and preferably at least equal to 2000%.

In addition, the resin is thermally stable as it is devoid of urea-formaldehyde (U-F) condensates known for their ability to decompose under the effects of the temperature. For their part, P-F-G condensates are stable under the abovementioned conditions and in particular generate little in the way of formaldehyde, especially during the aging of the final insulating product.

According to the invention, the condensation reaction of the phenol and the formaldehyde is followed by a reaction which consists in condensing glycine with the free phenol and the free formaldehyde, on the one hand, and the P-F condensates, on the other hand.

In order to obtain the resin as defined above, the invention provides a process which consists in reacting phenol and formaldehyde in the presence of a basic catalyst, in a formaldehyde/phenol molar ratio of greater than 1, in order to form P-F condensates and in subsequently introducing glycine into the reaction mixture, which glycine reacts with the free formaldehyde, the free phenol and the P-F condensates according to the Mannich reaction.

Preferably, the phenol and the formaldehyde are reacted in a formaldehyde/phenol molar ratio which varies from 2 to 4, is advantageously less than or equal to 3 and better still which varies from 2.50 to 2.65, up to a degree of conversion of the phenol of greater than or equal to 93%. At this stage of the condensation, the resin exhibits a dilutability in water of greater than 1000%.

The term "degree of conversion of the phenol" is understood to mean the percentage of phenol which has participated in the condensation reaction with the formaldehyde, with respect to the starting phenol. Preferably, the degree of conversion of the phenol is greater than or equal to 95% and advantageously greater than or equal to 97%.

In accordance with the invention, the glycine is gradually introduced into the reaction medium in order to avoid any untimely reaction for the phenol and the formaldehyde (exothermic reaction) and the temperature at the time of the addition of the glycine is kept constant throughout the duration of condensation of the glycine, while taking care that the dilutability in water of the resin remains at least equal to 1000%.

The introduction of the glycine is carried out at a temperature which can vary from 60 to 75° C., preferably of the order of 60° C.

Maintaining at the abovementioned temperature makes it possible in particular to react the glycine with virtually all the formaldehyde present in the reaction medium and consequently to lower the level of free formaldehyde in the final resin down to a value at most equal to 0.5%, preferably at most 0.3% and advantageously at most 0.1% of the total weight of liquid.

In addition, maintaining at the abovementioned temperature makes it possible to reduce the level of free phenol in the resin, in particular when the latter is obtained with a formaldehyde/phenol molar ratio of less than 3.

The resin is prepared according to a temperature cycle which comprises three phases: a heating phase, a temperature-maintenance phase and a cooling phase.

In the first phase, formaldehyde and phenol are mixed in the presence of a basic catalyst and said mixture is gradually heated to a temperature which varies from 60 to 75° C., preferably approximately 70° C. The formaldehyde/phenol molar ratio is greater than 1, preferably varies from 2 to 4, is advantageously less than or equal to 3 and better still varies from 2.50 to 2.65. The catalyst can be chosen from catalysts known to a person skilled in the art, for example triethylamine, lime (CaO) and alkali metal or alkaline earth metal hydroxides, for example sodium hydroxide, potassium hydroxide, calcium hydroxide or barium hydroxide. Sodium hydroxide is preferred.

The amount of catalyst varies from 2 to 15% by weight, preferably from 5 to 9% by weight and advantageously from 6 to 8% by weight, with respect to the weight of starting phenol.

In the second phase, the temperature of the reaction mixture at the end of the first phase is maintained within the abovementioned limits until P-F condensates are obtained. Preferably, the temperature is maintained until the degree of conversion of the phenol is at least equal to 93%, which makes it possible to guarantee a high proportion of P-F condensates. As already mentioned, the degree of conversion of the phenol is preferably at least equal to 95% and advantageously at least equal to 97%.

When the desired degree of conversion of the phenol is reached, the glycine is introduced into the reaction mixture in order for it to react with the residual formaldehyde and the residual phenol and the P-F condensates in order to form P-F-G condensates.

The addition of the glycine takes place gradually and can, for example, be carried out at the rate of 0.5 to 20%, preferably of 1 to 10% and advantageously of 2.8 to 4% by weight per minute of the total amount of glycine.

The amount of glycine employed represents from 0.1 to 0.5 mol, preferably from 0.2 to 0.3 mol, of glycine per mole of starting phenol. Preferably, the glycine is added at a temperature which varies from 60 to 65° C.

After the addition of the glycine, the temperature is kept constant for a further 10 to 180 minutes, preferably at least 30 minutes and advantageously for 60 to 120 minutes, so as to continue the condensation reaction of the glycine with the residual formaldehyde and the residual phenol and the P-F condensates up to a more advanced stage and to further reduce the amount of free formaldehyde and free phenol, the dilutability in water of the resin, measured at 20° C., having to be kept at least equal to 1000%.

In the third phase, the reaction mixture is cooled to a temperature of 20 to 25° C. approximately, preferably gradually over a period of time of the order of 30 to 40 minutes.

The pH of the liquid resin thus obtained is close to neutrality, that is to say that it varies from 4 to 11, preferably from 6.5 to 9 and advantageously from 7.5 to 8.3 as has already been mentioned. The achievement of such a pH results from the presence of the carboxyl group carried by the glycine residues in the phenol-formaldehyde-glycine condensates. The stage of treatment of the resin with an acid, particularly sulfamic acid, in order to adjust the pH is thus avoided.

The invention also relates to a sizing composition which can be applied to mineral fibers, in particular glass or rock fibers, and to insulating products obtained from these sized fibers.

The sizing composition is an aqueous composition which comprises the phenolic resin according to the present invention, at least one compound including at least one hydroxyl or amine functional group and sizing additives.

The abovementioned compound acts as crosslinking agent: it is capable of reacting with the carboxylic functional groups of the glycine residues carried by the phenol-formaldehyde-glycine condensates in order to form covalent bonds which contribute to the densifying of the polymer network at the junctions of the fibers.

Preferably, the abovementioned compound includes at least 2 hydroxyl and/or amine functional groups.

The preferred abovementioned compound is chosen from saccharides, advantageously oligosaccharides comprising up to 10 monosaccharide units, and better still monosaccharides and primary or secondary amines. Preferably, glucose, urea or a mixture of glucose and urea is chosen.

The amount of compound including at least one hydroxyl or amine functional group in the sizing composition varies from 1 to 40 parts by weight, preferably from 10 to 30 parts by weight, per 100 parts by weight of resin and said compound, calculated on the basis of the dry weight.

Given that the resin in accordance with the invention exhibits a very low content of free formaldehyde, of less than 0.5%, it is not necessary to add urea as agent which makes it possible to trap the formaldehyde in the sizing composition, unless it is desired to control the gel time of the sizing composition in order to avoid possible pregelling problems.

The amount of urea is at most equal to 25 parts by weight and preferably does not exceed 10 parts by weight, per 100 parts by weight of resin, polyol and urea, calculated on the basis of the dry weight.

Generally, the sizing composition in accordance with the invention additionally comprises the following additives, per 100 parts by weight of resin, polyol and urea, if appropriate, calculated on the basis of the dry weight:

0 to 5 parts of ammonium sulfate and/or ammonium sulfamate, generally less than 3 parts, 0 to 2 parts of silane, in particular an aminosilane, 0 to 20 parts of oil, generally 6 to 15 parts.

The role of the additives is known and briefly restated: the ammonium sulfate and the ammonium sulfamate act as polycondensation catalysts (in the oven under hot conditions) after the spraying of the sizing composition over the fibers; the silane is an agent for coupling between the fibers and the resin and also acts as antiaging agent; the oils are dust-preventing and hydrophobic agents.

Water can be added to the sizing composition in order to adjust the parameters according to the method of application targeted, which is preferably spraying.

The examples which follow make it possible to illustrate the invention without, however, limiting it.

The following analytical methods are used in the examples:

the amount of free phenol in the resin is measured by gas chromatography employing a capillary column (stationary phase: Stabilwax® sold by REZTK), an injector with flow splitter ("split injector"), a flame ionization detector (FID) and a data acquisition system (Chemstation, sold by Agilent), the amount of free formaldehyde in the resin is measured by colorimetry using ammonium acetate and acetylacetone solutions (LCK 325 method, edition 94/07, Dr Lange; CADAS 100 spectrophotometer), the thickness recovery is measured after compressing the insulating product with a degree of compression (defined as being the ratio of the nominal thickness to the thickness under compression) equal to 8/1. The thickness recovery is the ratio of the thickness measured to the nominal thickness, expressed as %; it makes it possible to evaluate the good dimensional behavior of the product, the tensile strength of the insulating product is measured according to the standard ASTM C 686-71T on a sample cut out by stamping. The sample has the shape of a torus with a length of 122 mm, a width of 46 mm, a radius of curvature of the cut-out of the outer edge equal to 38 mm and a radius of curvature of the cut-out of the inner edge equal to 12.5 mm.

The sample is positioned between two cylindrical mandrels of a test machine, one of which is movable and is moved at a constant rate. The breaking force F (in N) of the sample is measured and the tensile strength is calculated by the ratio of the breaking force F to the weight of the sample, expressed as N/g.

The tensile strength is measured after manufacture (TS man.) and after accelerated aging in an autoclave at a temperature of 105° C. and 100% relative humidity for 15 minutes (TS 15), the compounds present in the gas emissions generated during the manufacture of the insulating product are evaluated as follows: the emissions are collected and introduced at a rate of 4 liters per minute into 6 bubblers in series, each containing 100 ml of demineralized water, for 60 minutes. The water from the bubblers is combined and the contents of the following compounds (expressed in $mg/Sm^3$) are measured:

ammonia by high performance liquid chromatography (cation-exchange column (reference IonPack® CS17, sold by Dionex; eluant: methanesulfonic acid; conductimetric detector), free formaldehyde under the conditions already mentioned for the resin, free phenol by gas chromatography using a packed column (stationary phase: Tenax®-GC, sold by Interchim) and a flame ionization detector (FID), total phenol by colorimetry using a 4-nitroaniline solution (LCK 35 method, edition 93/10, Dr Lange; CADAS 100 spectrophotometer), total organic compounds (TOC) under the conditions of the standard FR EN 1484.

EXAMPLE 1

318.5 g of phenol (purity: 99%; 3.35 mol), 261.9 g of paraformaldehyde (purity: 96%; 8.37 mol) and 296.8 g of water are introduced into a 2 liter reactor surmounted by a condenser and equipped with a stirring system and the mixture is heated to 45° C. with stirring. The formaldehyde/phenol molar ratio is equal to 2.5.

47.4 g of sodium hydroxide as a 50% aqueous solution (i.e., 7% by weight, with respect to the phenol) are steadily added over 30 minutes, the temperature is then gradually raised to 70° C. over 30 minutes and the temperature is maintained for 120 minutes (a degree of conversion of the phenol at least equal to 93%).

Subsequently, the temperature is reduced to 60° C. over 30 minutes and, simultaneously, 75 g of glycine (purity: 98%; 0.98 mol) are steadily introduced into the reaction mixture. The temperature is maintained at 60° C. for 90 minutes and then the mixture is cooled down to 20° C. approximately over 40 minutes.

The liquid resin obtained is clear and has a solids content equal to 55%, a pH equal to 7.4 and a dilutability in water, at 20° C., of greater than 2000%.

The resin exhibits a level of free formaldehyde of less than 0.1% and a level of free phenol equal to 0.25%, the levels being expressed as total weight of liquid.

The resin is stable for at least 6 weeks at 20° C.

EXAMPLE 2

282.3 g of phenol (purity: 99.7%; 2.99 mol), 244.9 g of paraformaldehyde (purity: 96%; 7.83 mol) and 277.6 g of water are introduced into a 2 liter reactor surmounted by a condenser and equipped with a stirring system and the mixture is heated to 45° C. with stirring. The formaldehyde/phenol molar ratio is equal to 2.61.

39.5 g of sodium hydroxide as a 50% aqueous solution (i.e., 7% by weight, with respect to the phenol) are steadily added over 30 minutes, the temperature is then gradually raised to 70° C. over 30 minutes and the temperature is maintained for 120 minutes (a degree of conversion of the phenol at least equal to 93%).

Subsequently, the temperature is reduced to 60° C. over 30 minutes and, simultaneously, 66.52 g of glycine (purity: 99%; 0.88 mol) are steadily introduced into the reaction mixture. The temperature is maintained at 60° C. for 180 minutes and then the mixture is cooled down to 20° C. approximately over 30 minutes.

The liquid resin obtained is clear and has a solids content equal to 54.8%, a pH equal to 7.4 and a dilutability in water, at 20° C., of greater than 2000%.

The resin exhibits a level of free formaldehyde of less than 0.3% and a level of free phenol equal to 0.04%.

The resin retains a dilutability in water of greater than 2000% for at least 6 weeks of storage at 20° C.

EXAMPLE 3 (COMPARATIVE)

The procedure is carried out under the conditions of example 2, modified in that the glycine is replaced by aspartic acid (117 g; 0.88 mol).

The liquid resin obtained is cloudy and rapidly deposits sediment: a white precipitate, representing approximately 5% of the total volume of the resin, and a light yellow supernatant are formed.

The supernatant exhibits a pH equal to 4.1, a dilutability in water, at 20° C., equal to 300%, a level of free formaldehyde of less than 1.6% and a level of free phenol equal to 0.64%.

EXAMPLE 4 (COMPARATIVE)

Preparation of a Phenolic Resin Modified by an Amine According to WO 2008/043960 A1

378 g of phenol (4 mol) and 666.7 g of formaldehyde as a 45% aqueous solution (10 mol) are introduced into the reactor of example 1 and the mixture is heated to 45° C. with stirring. The formaldehyde/phenol molar ratio is equal to 2.5.

52.9 g of sodium hydroxide as a 50% aqueous solution (i.e., 7% by weight, with respect to the phenol) are steadily added over 30 minutes, the temperature is then gradually raised to 70° C. over 30 minutes and the temperature is maintained for 80 minutes, so as to achieve a degree of conversion of the phenol equal to 93%.

Subsequently, the temperature is reduced to 60° C. over 30 minutes and, simultaneously, 68.4 g of monoethanolamine (1.11 mol) are steadily introduced into the reaction mixture. The temperature is maintained at 60° C. for 15 minutes and then the mixture is cooled down to 25° C. approximately over 30 minutes. Sulfamic acid as a 15% solution is added over 60 minutes, until the pH is equal to 4.7, followed by 200 g of urea.

The resin thus obtained exhibits a solids content equal to 58%, a dilutability in water, at 20° C., of greater than 2000%, a level of free formaldehyde of less than 0.1% and a level of free phenol equal to 0.3%, these last two levels being expressed as total weight of liquid.

EXAMPLE 5 (COMPARATIVE)

283.5 g of phenol (3 mol) and 640 g of formaldehyde as a 45% aqueous solution (9.6 mol) are introduced into the reactor of example 1 and the mixture is heated to 45° C. with stirring. The formaldehyde/phenol molar ratio is equal to 3.2.

34 g of sodium hydroxide as a 50% aqueous solution (i.e., 6% by weight, with respect to the phenol) are steadily added over 30 minutes, the temperature is then gradually raised to 70° C. for 30 minutes and the temperature is maintained for 105 minutes.

The temperature of the mixture is brought to 35° C. over 35 minutes and sulfamic acid is added until the pH is equal to 7.3.

The resin exhibits a solids content equal to 48.5%, a dilutability in water, at 20° C., of greater than 2000%, a level of formaldehyde equal to 5.3% and a level of free phenol equal to 0.41%, these last two levels being expressed as total weight of liquid. The resin exhibits a dilutability in water, at 20° C., of greater than 1000% after 30 days of storage at 14° C.

EXAMPLES 6 TO 9

Production of Acoustic and/or Thermal Insulating Products a) Preparation of Sizing Compositions The resins of examples 1, 2, 4 and 5 are used to prepare the following sizing compositions (as parts by weight (solids content)):

Example 6 (according to the invention)
   80 parts of the resin of example 1
   10 parts of urea
   10 parts of glucose
   9.5 parts of oil (Mulrex®)
   1 part of ammonium sulfate
   1 part of silane (gamma-aminopropyltriethoxysilane)

Example 7 (according to the invention)
   80 parts of the resin of example 2
   10 parts of urea
   10 parts of glucose
   9.5 parts of oil (Mulrex®)
   1 part of ammonium sulfate
   1 part of silane (gamma-aminopropyltriethoxysilane)

Example 8 (Comparative)
   100 parts by weight of the resin of example 4
   9.5 parts of oil (Mulrex®)
   3 parts of ammonium sulfate
   0.5 part of silane (gamma-aminopropyltriethoxysilane)

Example 9 (comparative)
   70 parts by weight of the resin of example 5
   30 parts by weight of urea
   9.5 parts of oil (Mulrex®)
   3 parts of ammonium sulfate
   0.5 part of silane (gamma-aminopropyltriethoxysilane)
   6 parts of a 20% by weight aqueous ammonia solution.

b) Manufacture of the Insulating Products

Glass wool is manufactured in a pilot plant operating by internal centrifugation and the sizing composition according to example 6, 7, 8 or 9 is sprayed over the glass fibers on exiting from the fiberizing device in a proportion of 4.7% by dry weight of the sizing composition, with respect to the weight of the fibers. The sized fibers are collected on a belt conveyor, where they form a glass wool mat which is subsequently subjected to a heat treatment in an oven, so as to obtain a minimum temperature of 200° C. at the core of the product.

The final insulating product has a nominal thickness of 80 mm and a nominal density of 10.6 kg/m$^3$.

The values of the recovery in thickness and of the tensile strength of examples 6 and 8 are collated in table 1.

TABLE 1

|  | Example 6 | Example 8 (comparative) |
|---|---|---|
| Recovery in thickness (%) | | |
| 1 hour | 150 | 145 |
| 24 hours | 140 | 140 |
| 12 days | 140 | 140 |
| 30 days | 135 | 130 |
| Tensile strength (N/g) | | |

TABLE 1-continued

|  | Example 6 | Example 8 (comparative) |
|---|---|---|
| TS man. | 2.9 | 2.2 |
| TS 15 | 2.7 | 2.1 |

The product of example 6 according to the invention exhibits values for recovery in thickness comparable to those of the resin of example 8 and a better tensile strength.

The measurements of the emissions generated during the manufacture of the products of examples 7 to 9, in the chamber for receiving the fibers ("forming chamber") and in the oven, are collated in the following table 2.

TABLE 2

|  | Example 7 | Example 8 (comparative) | Example 9 (comparative) |
|---|---|---|---|
| Ammonia (mg/Sm$^3$) | 5.8 | 19.3 | 31.6 |
| Formaldehyde (mg/Sm$^3$) | 1.1 | 0.3 | 4.4 |
| Free phenol (mg/Sm$^3$) | 0.05 | 3.1 | 3.1 |
| Total phenol (mg/Sm$^3$) | 1.5 | 7.9 | 10.2 |
| TOC (mg/Sm$^3$) | 9.3 | 15.6 | 24.2 |

The amounts of these various products emitted appearing in this table do not reflect the true emissions on a line for the industrial manufacture of insulating products but they should be read in order to compare the behavior of the sizing compositions tested.

The insulating product according to the invention emits less ammonia, free or total phenol and total organic compounds (TOC) than those of comparative examples 8 and 9. The amount of formaldehyde emitted is lower than with a conventional phenol-formaldehyde resin (example 9) but, however, remains slightly higher than with the resin with a very low level of formaldehyde according to example 8.

What is claimed is:

1. A liquid resin intended to participate in the makeup of a sizing composition for mineral fibers, the liquid resin essentially consisting of phenol-formaldehyde (P-F) condensates and phenol-formaldehyde-glycine (P-F-G) condensates, wherein the liquid resin exhibits a level of free formaldehyde no more than 0.5% and a level of free phenol no more than 0.5%, and wherein the liquid resin exhibits a dilutability in water at 20° C. of at least 1,000%.

2. The resin as claimed in claim 1, wherein the liquid resin exhibits a level of free formaldehyde at most equal to 0.3% as total weight of liquid.

3. The resin as claimed in claim 1, wherein the liquid resin exhibits a level of free phenol of less than or equal to 0.3% as total weight of liquid.

4. The resin as claimed in claim 1, wherein the liquid resin exhibits a pH, measured at 20° C., which varies from 4 to 11.

5. The resin as claimed in claim 1 wherein the liquid resin exhibits a dilutability in water, at 20° C., of greater than or equal to 2000%.

6. A process for the preparation of a resin as claimed in claim 1, comprising reacting phenol and formaldehyde in the presence of a basic catalyst, in a formaldehyde/phenol molar ratio of greater than 1, in order to form P-F condensates, and subsequently introducing glycine into the reaction mixture, which glycine reacts with the free formaldehyde, the free phenol and the P-F condensates according to the Mannich reaction.

7. The process as claimed in claim 6, wherein the formaldehyde and the phenol are reacted in a formaldehyde/phenol molar ratio which varies from 2 to 4.

8. The process as claimed in claim 7, wherein reaction of the phenol and formaldehyde is continued until the degree of conversion of the phenol is greater than or equal to 93%.

9. The process as claimed in claim 6, wherein the reaction between the phenol and the formaldehyde is carried out at a temperature which varies from 60 to 75° C.

10. The process as claimed in claim 6, wherein the glycine is gradually introduced into the reaction medium and the temperature at the time of the addition of the glycine is kept constant throughout the duration of condensation of the glycine, the dilutability in water of the resin having to remain at least equal to 1000%.

11. The process as claimed in claim 6, wherein the addition of the glycine is carried out at the rate of 0.5 to 20% by weight per minute of the total amount of glycine.

12. The process as claimed in claim 6, wherein the amount of glycine represents from 0.1 to 0.5 mol of glycine per mole of starting phenol.

13. The process as claimed in claim 6, wherein, after the introduction of the glycine, the temperature is kept constant for 10 to 180 minutes.

14. An aqueous sizing composition for mineral fibers, comprising a phenolic resin as claimed in claim 1, at least one compound including at least one hydroxyl or amine functional group and sizing additives.

15. The composition as claimed in claim 14, wherein said compound includes at least 2 hydroxyl and/or amine functional groups.

16. The composition as claimed in claim 14, wherein said compound is chosen from saccharides and primary or secondary amines.

17. The composition as claimed in claim 16, wherein said compound is glucose, urea or a mixture of glucose and urea.

18. The composition as claimed in claim 14, wherein the amount of said compound varies from 1 to 40 parts by weight per 100 parts by weight of resin and said compound, calculated on the basis of the dry weight.

19. An insulating product, comprising mineral fibers sized using the sizing composition as claimed in claim 14.

20. The insulating product as claimed in claim 19, wherein the insulating product is a thermal and/or acoustic insulating product.

* * * * *